United States Patent [19]

Imura et al.

[11] 4,206,990
[45] Jun. 10, 1980

[54] POWER SUPPLYING SYSTEM FOR USE IN AN AUTOMATIC FOCUSING CAMERA

[75] Inventors: Toshinori Imura; Akira Yamanaka, both of Sakai, Japan

[73] Assignee: Minolta Camera Kabushiki Kaisha, Osaka, Japan

[21] Appl. No.: 946,532

[22] Filed: Sep. 27, 1978

[30] Foreign Application Priority Data

Oct. 5, 1977 [JP] Japan .................. 52-120189

[51] Int. Cl.² .................... G03B 3/10; G03B 7/08
[52] U.S. Cl. .................... 354/195; 354/25; 354/266
[58] Field of Search ............ 354/25, 60 R, 195, 198, 354/266

[56] References Cited

U.S. PATENT DOCUMENTS

| | | | |
|---|---|---|---|
| 3,211,069 | 10/1965 | Rixton | 354/135 |
| 3,442,193 | 5/1969 | Pagel | 354/25 |
| 3,599,548 | 8/1971 | Hennig | 354/266 X |
| 3,813,679 | 5/1974 | Hasegawa et al. | 354/25 |

FOREIGN PATENT DOCUMENTS

| | | | |
|---|---|---|---|
| 2242836 | 3/1974 | Fed. Rep. of Germany | 354/266 |
| 2734725 | 2/1978 | Fed. Rep. of Germany | 354/266 |

49-625 of 1974 Japan .

*Primary Examiner*—Michael L. Gellner
*Attorney, Agent, or Firm*—Wenderoth, Lind & Ponack

[57] ABSTRACT

An automatic focusing camera according to the present invention includes an automatic distant measuring system which generates a signal indicative of a distance between the camera and a target object to be photographed upon receipt of electric power. A focusing mechanism is operatively connected to the automatic focusing system for shifting a movable objective lens automatically to a properly focused position relative to the target object. A shutter release button includes a switch mechanism for electrically connecting a power source and the automatic distance measuring system; and a shaft actuating the focusing mechanism when the shutter release button is pressed down. The switch mechanism in the shutter release button is closed upon application of a finger touch to the shutter release button, either by completion of an electric circuit through the fingertip or by sensing the finger pressure, to supply electric power to the automatic distance measuring system. By this means the automatic distance measuring system is powered to reach a stable operational state prior to the opening of the camera shutter.

8 Claims, 4 Drawing Figures

POWER SUPPLYING SYSTEM FOR USE IN AN AUTOMATIC FOCUSING CAMERA

BACKGROUND OF THE INVENTION

The present invention relates to a camera provided with an automatic focusing system and, more particularly, to a power supplying system employed in a camera for supplying the electric power to the automatic focusing system.

When taking a photograph with the above described type of camera, it is necessary for the automatic focusing system to determine the distance between the camera and a target object before releasing the shutter mechanism. For this reason, it is preferable to render the automatic focusing system operative before the release of the shutter mechanism. In this sense, it is quite difficult to control the supply of power to the automatic focusing system.

Generally, the automatic focusing system includes a distance measuring element which consumes a very large amount of electric power during its operation. Therefore, it is practical to operate the automatic focusing system for as short a period of time as possible before releasing the shutter mechanism.

In order to meet this requirement, the automatic focusing system may be made operative simultaneously with the start of movement of depression of the shutter button. However, since the automatic focusing system includes a capacitive component, the time interval between the start of movement of the shutter button and the termination of this movement, which coincides with the moment when the shutter mechanism is released, is typically not enough for the capacitive component to be charged with a sufficient voltage. In other words, the automatic-focusing system requires a longer period of time than this time interval to establish a stable operating condition. Furthermore, it is necessary to provide the necessary time to shift the objective lens assembly of the camera in accordance with a measured signal obtained from the automatic focusing system before releasing the shutter mechanism after the measured signal is obtained from the automatic focusing system in a stable condition. Therefore, in order to provide sufficient time for the automatic focusing system to establish a stable operating condition and for the objective lens assembly to be placed in a properly focused position in accordance with the received measured signal, it is necessary to supply electric power to the automatic focusing system before the start of movement of the shutter button.

Although this requirement may be met by providing a manually operable switch to the automatic focusing system, the photographer may often forget to turn such a manually operable switch on or off.

SUMMARY OF THE INVENTION

Accordingly, a primary object of the present invention is to provide a power supplying system which provides electric power to the automatic focusing system for a short period of time sufficient for the automatic focusing system to establish a stable operating condition and for the objective lens assembly to be placed in a properly focused position before actuation of the shutter Another object of the present invention is to provide a power supplying system of the above described type which is simple in construction and can be readily manufactured at low cost.

In accordance with a preferred embodiment of the invention, the power supplying system for use in a camera comprises a source of electric power and an automatic focusing system for producing, upon receipt of electric power from the power source, a zone signal indicating one particular range zone where the target object to be photographed is located. This one particular range zone is selected from a plurality of zones relative to the camera. An objective lens movable to one of a plurality of focal positions relative to the focal plane of the camera is mounted in the body of the camera for focusing an image of the target object located within the zone on the focal plane. A focusing means is operatively connected to the automatic focusing system for moving the objective lens automatically to the focal position corresponding to the particular zone so identified by the zone signal. The power supplying system further comprises a shutter release button including a switch mechanism electrically connected between the power source and the automatic focusing system, and a shaft member for operating the focusing means. The switch mechanism is closed upon application of a finger touch to the shutter release button, while the shaft member actuates the focusing means when the shutter release button is pressed down.

In accordance with a further preferred embodiment of the invention, the switch mechanism is coupled to a memory circuit which keeps the power source and the automatic focusing system connected until the shutter release button is pressed down.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figures 1, 2:
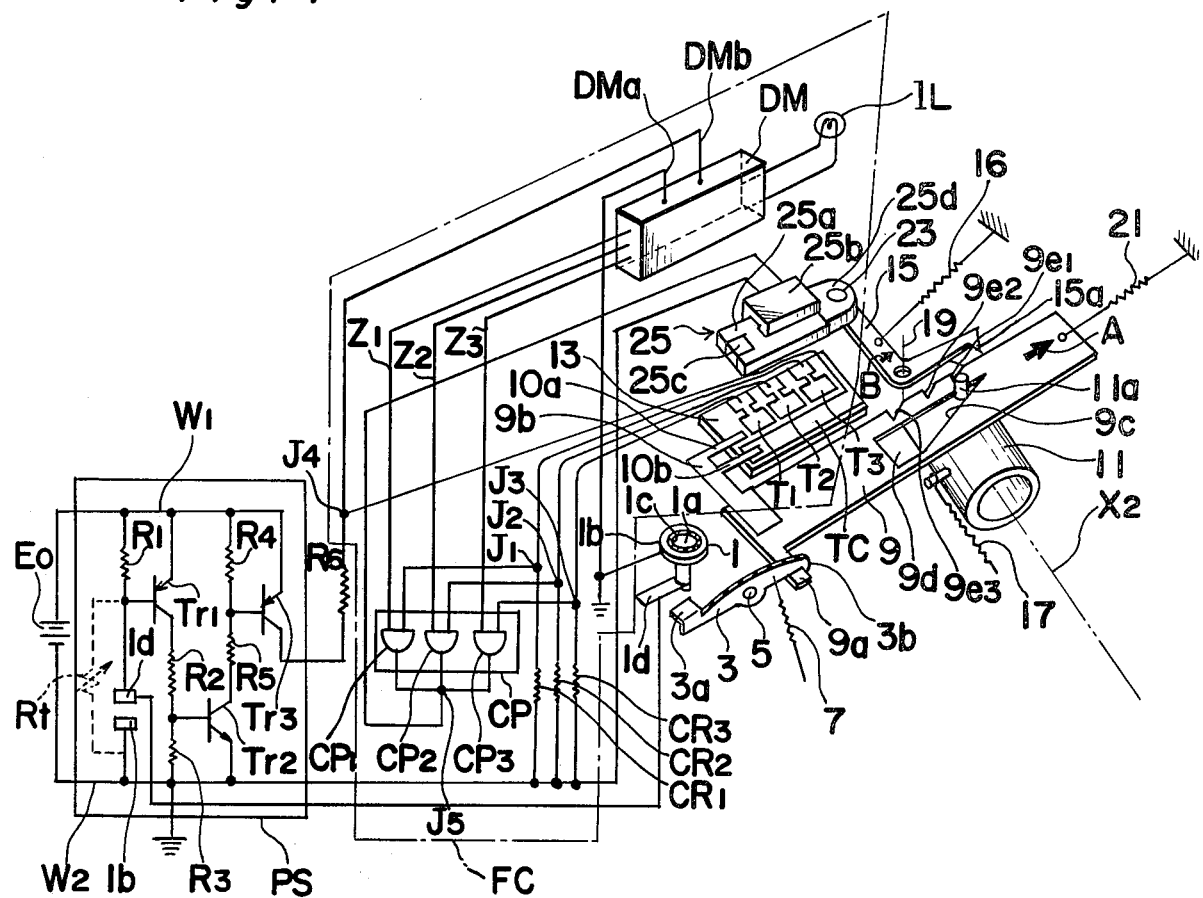
FIG. 1 is a schematic diagram of a power supplying system according to one embodiment of the invention.
FIG. 2 is a schematic diagram of a distance measuring element employed in the system shown in FIG. 1.

Before the description of the present invention proceeds, note that like parts are designated by like reference numerals throughout the accompanying drawings.

Referring to FIG. 1, there is shown one embodiment of a power supplying system according to the present invention employed in an automatic focusing camera. The power supplying system comprises a power supplying circuit PS having a source of electric power Eo connected thereto, an automatic rangefinder FC for producing, upon receipt of an electric power from the power supplying circuit PS, a signal indicating the one particular range zone where the target object to be photographed is located, this one particular range zone being selected from a plurality of zones such as zones A, B and C (FIG. 2) classified as near, intermediate and far zones, respectively, relative to the camera and a lens positioning mechanism for positioning the objective lens assembly 11 at a corresponding position for focusing the target object located in this one particulr zone on the focal plane where the film is placed. Each of the components is described in detail, hereinbelow.

Before describing the power supplying circuit PS, an example of the shutter release button 1 will now be described. The shutter release button 1, according to the present invention, comprises a core 1a made of electrically conductive material, a peripheral ring 1b also made of electrically conductive material and an insulating ring 1c positioned between the core 1a and the peripheral ring 1b for electrically insulating these conductors. The core 1a extends downwardly through the ring 1b and is connected to a terminal plate 1d. The shutter release button 1 is so designed that upon application of finger pressure to the shutter button, an electrical connection is obtained between the core 1a and peripheral ring 1b through the finger.

The power supplying circuit PS comprises a positive lead wire W1 and a negative lead wire W2 which extend from the respective positive and negative terminals of the power source Eo, such as a battery. A resistor R1 is connected between the positive lead wire W1 and the terminal 1d of the shutter button 1. The other terminal 1b of the shutter button 1 is connected to the negative lead wire W2 which is in common with the body of the camera. A transistor Tr1 has its base connected to the terminal 1d and its emitter connected to the positive lead wire W1. The collector of the transistor Tr1 is connected to the negative lead wire W2 through the series connection of resistors R2 and R3. The junction between the resistors R2 and R3 is connected to the base of an amplifying transistor Tr2. The emitter of the transistor Tr2 is connected to the negative lead wire W2 while the collector thereof is connected to the positive lead wire W1 through the series connection of resistors R4 and R5. The junction between the resistors R4 and R5 is connected to the base of an output transistor Tr3 having the emitter thereof connected to the positive lead wire W1. The collector of the transistor Tr3 is connected through a resistor R4 to the positive power input DMb of a distance measuring element DM employed in the automatic rangefinder FC.

One example of the distance measuring element DM is shown diagrammatically in FIG. 2 in which the box shown by the dashed line corresponds to the element DM. The distance measuring element DM comprises first and second convergent lenses PL and RL arranged a side-by-side relation to each other. A light emitting diode LD formed of two layers of semiconductive material and capable of emitting light from the junction between these layers is positioned behind the first convergent lens PL in alignment with the optical axis X1 of the lens PL in relation to the direction in which the camera is aimed at a target object which may be located in any one of the plurality of range zones A, B and C, and at a position adjacent to the secondary focal point of the convergent lens PL. Note that the distance measuring element DM is so positioned in the camera as to align the optical axis X1 in parallel with the optical axis X2 of the objective lens assembly 11 employed in the camera. A source of power (not shown) is connected to the light emitting diode LD for producing a pulse of light from the diode LD each time the distance is measured. This light pulse produced from the light emitting diode LD projects through the first convergent lens PL towards the object space away from the camera.

The distance measuring element DM further comprises a plurality of, for example, three, photoresponsive elements P1, P2 and P3 arranged in side-by-side relation to each other and positioned behind the second convergent lens RL in terms of the direction in which the camera is aimed at the target object. The photoresponsive elements P1 to P3 are so arranged relative to the second convergent lens RL that the image of the target object is formed on the photosensitive element P1, if the target object is located within the zone A; on the photoresponsive element P2, if the same is located within the zone B; and on the photoresponsive element P3, if the same is located within the zone C.

The photoresponsive elements P1, P2 and P3 are electrically coupled with memory elements ME1, ME2 and ME3, respectively, which are included in a memory circuit ME for storing any output signal produced by one of the photoresponsive elements P1 to P3 for a predetermined period of time. The memory elements ME1, ME2 and ME3 are connected to external lead wires Z1, Z2 and Z3, respectively. The operation of the distance measuring element DM will now be described hereinbelow.

Assuming that the target object T is located at a predetermined position within the object space and that the beam of light produced by the light emitting diode LD and subsequently reflected from the target object T impinges upon the photoresponsive element P2 through the convergent lens RL, the magnitude of a parameter, for example the generated voltage or the internal resistance, of the photoresponsive element P2 varies as a function of the intensity of the incident illumination, thereby indicating that the predetermined position of the target object T is within the range zone B. The signal produced from the photoresponsive element P2 is applied to the memory element ME2 which produces a high signal for a predetermined period of time through the lead wire Z2.

Referring to FIG. 1, an indication lamp 1L coupled to the distance measuring element DM lights after any one of the photoresponsive elements P1 to P3 produces a signal indicating a stable condition and indicating that the distance measuring element DM has measured the zonal distance between the camera and the target object T. In the case where the target object T is not brighter than the required brightness, the indication lamp 1L remains deenergized, even when the distance measuring element DM is brought to a stable condition, in order to indicate that the target object T is too dark to take a proper photograph.

The automatic rangefinder FC comprises the AND elements CP1, CP2 and CP3 having their first input terminals connected to the lead wires Z1, Z2 and Z3, respectively. The second input terminal and the AND elements CP1 to CP3 are connected to the negative lead wire W2 the resistors CR1, CR2 and CR3 by way of through respective junctions J1, J2 and J3, respectively. Since the resistors CR1, CR2 and CR3 are of equal resistance, the junctions J1, J2 and J3 have the same voltage signal when a predetermined voltage source is impressed across these resistors CR1 to CR3. The junctions J1, J2 and J3 are also connected to terminal plates T1, T2 and T3, respectively, which are bonded in a row on a platform 13 which is ridigly mounted in the camera. The platform 13 also has bonded thereon a common terminal plate TC which is connected to the junction J4 between the resistor R6 and the positive power input DMb of the distance measuring element DM. The common terminal plate TC is adapted to be sequentially connected to the terminal plates T1, T2 and T3 by means of a bridge plate 9b in a manner that will be described in detail later.

The outputs of the AND elements CP1, CP2 and CP3 are connected to each other at a junction J5 which is connected in turn to one input of a coil switch assembly 25. The other input of the coil switch assembly 25 is connected to the body of the camera. The coil switch assembly 25 includes a frame 25a made of a magnetic material, a permanent magnet 25c for normally magnetizing the frame 25a, a coil 25b mounted on the frame 25a for cancelling the magnetic attraction of the permanent magnet 25c when energized by developing a counteracting magnetic force on the frame 25a, and a contact number 25d made of a magnetic material. The contact member 25d is normally held in contact with the frame 25a by the magnetic force of attraction produced by the permanent magnet 25c, but is disengaged from the frame 25a when the coil 25b is energized. The contact member 25d is connected to an L-shaped lever 15 which is included in the lens positioning mechanism described hereinbelow.

The lens positioning mechanism comprises an elongated rectangular movable plate 9 coupled to a spring means 21 which urges the elongated movable plate 9 in a longitudinal direction as indicated by the arrow A. The movable plate 9 has a triangle opening 9d formed approximately in a central portion thereof and having a slanted edge 9c. The slanted edge 9c slidingly contacts a projection 11a rigidly mounted on the objective lens assembly 11. The objective lens assembly 11 is arranged to move between the hyperfocal or infinity focal position and the near position in alignment with the optical axis X2 of the lens 11, and is biased towards, for example, the near position by means of an urging spring 17. As the movable plate moves in the direction A, the projection 11a slidingly moves along the slanted edge 9c to cause the objective lens assembly 11 to move towards the near focal position. The bridge plate 9b which is made of electrical conductive material and is rigidly mounted on the movable plate 9 extends outwardly from the movable plate 9 and has a pair of arms 10a and 10b extending parallel to the direction of movement of the movable plate 9. As the bridge plate 9b moves towards the direction A together with the movable plate 9, the arm 10b slidingly moves over the common terminal plate TC, while the arm 10a slidingly and sequentially moves over the terminal plates T1, T2 and T3. The movable plate 9 is formed with three detent recesses 9e1, 9e2 and 9e3 defined in one side edge of the plate 9 for engagement with the L-shaped lever 15. The L-shaped lever 15 is pivotally mounted about an intermediate portion thereof on a pin 19 provided on the body of the camera, and is biased about the pin 19 by a spring 16 in the direction indicated by the arrow B. One end of the lever 15 is provided with the contact member 25d described above while the other end of the lever 15 is provided with a hook 15a which is engageable in any one of the detent recesses 9e1, 9e2 and 9e3 when rotated in the direction B. The movable plate 9 has one end formed with a projection 9a for engagement with a lever 3. The lever 3 is pivotally mounted about an intermediate position thereof on a pin 5 provided on the camera. One end portion of lever 3 is formed into a bentover portion 3a providing a flat area. The other end portion of the lever 3 remote from the bent-over portion 3a is formed into a hook 3b engageable with the projection 9a. The lever 3 is biased by an urging spring 7 towards an engaged position in which the hook 3b is engaged with the projection 9a as shown in FIG. 1. The disengagement of the hook 3b from the projection 9a is effected when the shutter button is depressed to such an extent that the core 1a presses the bentover portion 3a to rotate the lever 3 about the pin 5 against the biasing force. For the purpose of insulating the core 1a from the body of the camera, which is in common with the negative side of the battery Eo, the lever 3 or at least the bent-over portion 3a is made of an electrically non-conductive material. The operation of the power supplying system described above will now be explained hereinbelow.

Starting from the position as shown in FIG. 1 in which the shutter releasing mechanism (not shown) is loaded and ready for the actual taking of a photographic picture, application of finger pressure to the shutter button 1 results in the core 1a and the peripheral ring 1b being electrically connected to each other through the finger used to apply the finger pressure. This is possible because, as shown by the dashed line in the power supplying circuit PS, the finger can be considered constitute a variable resistance RT; the resistance setting of which is sufficient to electrically connect the core 1a to the peripheral ring 1b and which is also sufficient to turn the transistor Tr1 into a conductive state. Thereupon, the transistor Tr1 is switched on, and in turn, the transistors Tr2 and Tr3 are sequentially switched on. Thus, the distance measuring element DM is supplied with electric power from the battery Eo through the transistor Tr3 and the resistor R6 and, at the same time, the common terminal plate TC provided on the platform 13 has the positive voltage from the junction J4 applied thereto. Upon receipt of the power, the distance measuring element DM produces a high level signal on one of the lead wires Z1, Z2 and Z3, indicating that the target object T is within one of the zones A, B and C. Assuming that the target object T is within zone B, the high level signal will be produced from the lead wire Z2. The generation of this high level signal in any one of the lead wires Z1, Z2 and Z3 is announced to the photographer by means of the indication lamp 1L. Thereafter, the photographer pushes down the shutter button 1 to disengage the movable plate 9 from the lever 3. Thus, the movable plate 9 together with the bridge plate 9d is moved in the direction A at a predetermined speed. As the terminal plates T1, T2 and T3 are sequentially shortcircuited to the common terminal plate TC by the bridge plate 9d, a predetermined voltage will be produced sequentially across the resistors CR3, CR2 and CR1. This voltage is sequentially applied to the AND elements CP3, CP2 and CP1. According to the above assumption, since the high level signal appears on the lead wire Z2 while low level signals appears on the other lead wires Z1 and Z3, only the AND element CP2 can be triggered on to produce a high level signal therefrom. More particularly, when the arm 10a of the bridge plate 9b slidingly moves over the terminal plate T2, the voltage produced across the resistor CR2 triggers the AND element CP2 on to generate a high level signal therefrom. This high level signal is applied to the coil 25b for producing a magnetic force in the frame 25a. This magnetic force produced in the frame 25a by coil 25b counteracts the magnetic force of the permanent magnet 25c to release the contact member 25d, which have been attracted to the frame 25a by the magnetic force of the magnet 25c, from the frame 25a to allow the rotation of the L-shaped lever 15 in the direction B. Upon rotation of the L-shaped lever 15, the hook 15a engages the detent recess 9e2 to stop the movement of the movable plate 9. Thus, the objective lens assembly 11 which have been moving towards the near focal position by the action of the spring 17 stops at the intermediate focal position where the target object T located within the zone B can be properly focused on the focal plane (not shown) of the camera.

Note that the movable plate 9 is coupled to another movable plate (not shown) which starts to move at the same time the movable plate 9 starts to move but continuously moves even after the movable plate 9 would be stopped by the engagement of the hook 15a with the furtherest detent recess 9e3 so as to ensure the positioning of the objective lens assembly before the image of the target object T is projected on the film surface. Thereafter, the completion of the movement of the other movable plate releases the shutter to project an image on the film surface.

Note that the terminal plates T1, T2 and T3 are arranged in a row an order corresponding to the order of development of the zones C, B and A in the object space away from the objective lens assembly of the camera, respectively. Yet, each of the terminal plates T1, T2 and T3 has a width, as measured in the direction of the movement of the bridge plate 9b, such that the electric contact between the terminal plate T1, T2 and T3 and the common terminal plate TC through the bridge plate 9b continues for a period of time required for the objective lens assembly 11 to axially move a distance corresponding to the distance range of the corresponding zone.

Note further that the detent recesses 9e1, 9e2 and 9e3 are positioned in such a manner that the hook 15a may be engaged into the recess 9e1, 9e2 or 9e3 immediately after the arm 10a moves past the corresponding terminal plate T1, T2 or T3.

Figure 3:
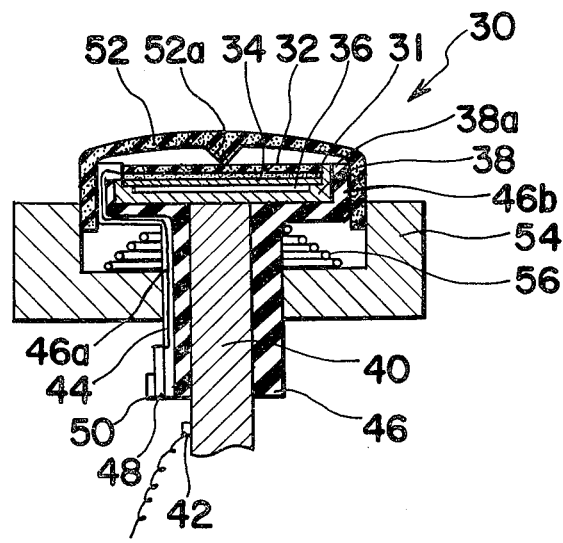
FIG. 3 is a side sectional view of a shutter button employed in a power supplying system shown in FIG. 4.
Figure 4:
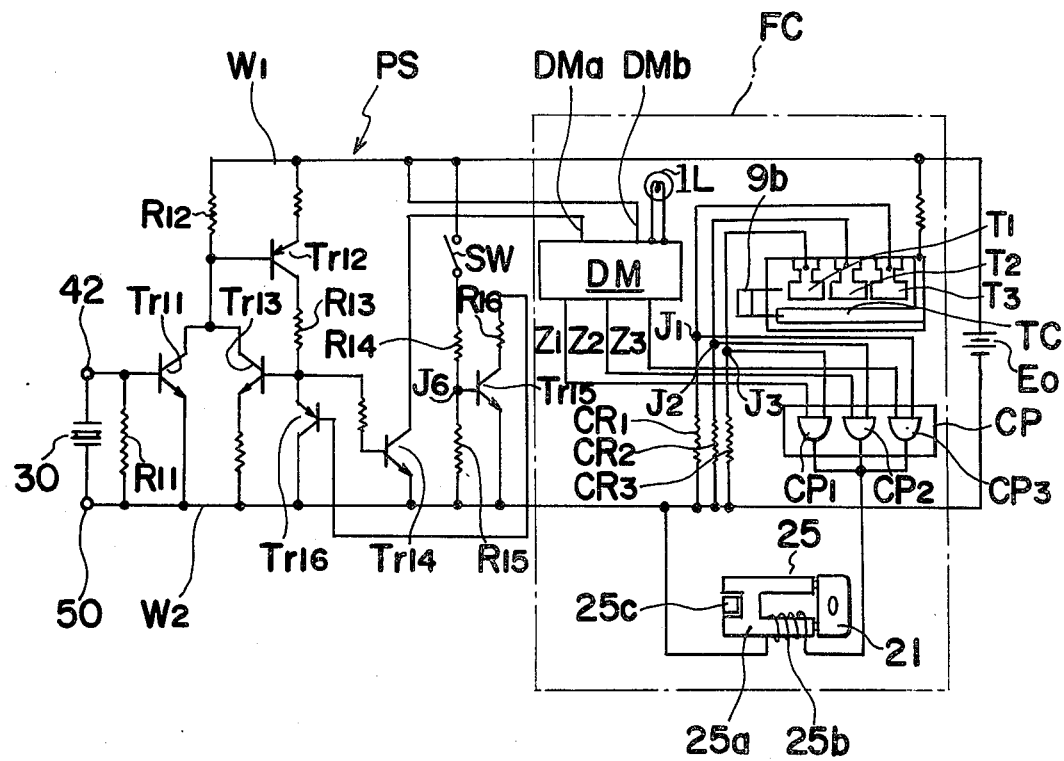
FIG. 4 is a schematic diagram of a power supplying system according to another embodiment of the invention.

FIG. 3 shows a fragmentary sectional view of the shutter button 30 and FIG. 4 shows an electric circuit diagram which are employed in another embodiment of the power supplying system according to the present invention. First, the shutter button 30 will be described.

Referring particularly to FIG. 3, the shutter button 30 comprises a pressure detecting layer 31, a layer 32 made of an elastic material such as rubber bonded to the top surface of the pressure detecting layer 31 and a layer 34 made of electric conductive material such as aluminum bonded to the bottom surface of the pressure detecting layer 31. The pressure detecting layer 31 may be made of a piezoelectric material which generates a voltage when it is curved or deflected under the influence of an external pressure applied thereto. For this purpose, "Kureha KEPIEZO film" (trade name) which is a product manufactured by Kureha Chemical Co., Ltd. of Japan, can be employed as a pressure detecting layer 31. These three composite layers 31, 32 and 34 are placed in a casing 38 made of electric conductive material and positioned in such a manner that only the peripheral edge portion of the aluminum layer 34 is held in contact with the casing 38. Accordingly, a narrow gap 36 is provided between the central portion of the aluminum layer 34 and the bottom of the casing 38 to allow deflection of the pressure detecting layer 31. The casing 38 is supported by a shaft or core 40 which is made of an electric conductive material and which is rigidly connected to the lower surface of the casing 38 and extends downwardly for releasing the shutter mechanism (not shown) when the shaft 40 is moved downwardly as a result of depressing the shutter button 30. The casing 38 and the shaft 40 are enveloped by an insulating member 46. A groove 46b formed along the outer side surface of the insulating member 46 is provided for a lead wire 44 which extends from the upper surface of the pressure detecting layer 31 to a contacting element 48 bonded to the bottom portion of the insulating member 46. A terminal 50 rigidly or slidingly coupled to the contacting member 40 is used for an external electric connection. Accordingly, the voltage generated by the pressure detecting layer 31 is obtained between the terminal 50 and a terminal 42 which is slidingly held in contact with the shaft 40. This voltage is applied to a power supplying circuit which will be described in detail later with reference to FIG. 4.

Still referring to FIG. 3, the push button 30 further comprises a cap member 52 made of elastic material such as rubber or synthetic resin and having peripheral edges rigidly bonded to the outer surface of the insulating member 46. A projection 52a is integrally formed on the inside surface of the cap member 52 and is held in contact with the elastic material layer 32. Accordingly, a slight touch of the cap member 52 provides a very high pressure on the layer 32 where it is in contact with the projection 52a. A frame 54 has an opening which slidingly receives the shaft 40 provided with the insulating member 46, and also has a recess. The inner surface of this recess is tightly bonded to the outer peripheral surface of the cap member 52 for protecting the layers 31, 32 and 34 from being damaged by water or dust. A spiral spring 56 mounted on the shaft 40 outside of the insulating member 46 and disposed between the bottom of the recess formed in the frame 54 and the insulating member 46 is used for biasing the three layers 31, 32 and 34 upwardly against the cap member 52.

The functions of the above described shutter button 30 will now be explained hereinbelow.

When a slight pressure which is far less than the pressure required for pressing down the button against the biasing force of the spring 56 is applied to the cap member 52, all of this finger touch pressure is centralized in the projection 52a. As a result, the layer 31 is deflected and a voltage is produced across the terminals 50 and 42.

Referring now to FIG. 4, the power supplying circuit PS shown is connected to the battery Eo through positive and negative lead wires W1 and W2. The terminal 42 of the shutter button 30 is connected to the base of terminal 50 is connected to the transistor Tr11 and the negative lead wire W2, while a resistor R11 is connected between the terminals 42 and 50 for applying a differentiated signal to the base of the transistor Tr11 when the switch button 30 generates a voltage. The emitter of the transistor Tr11 is connected to the negative lead wire W2 and the collector thereof is connected through a resistor R12 to the positive lead wire W1. A transistor Tr13 has its collector connected to the collector of the transistor Tr11 and its emitter connected through a suitable resistor to the negative lead wire W2. The base of the transistor Tr13 is connected to the emitter of the transistor Tr16 and is also connected to the base of a transistor Tr14 through a suitable resistor. The collector of the transistor Tr16 is connected to the negative lead wire W2 while the emitter of the transistor Tr16 is connected to the collector of a transistor Tr12 through a resistor R13. The emitter of the transistor Tr12 is connected to the positive lead wire W1 through a suitable resistor while the base of the transistor Tr12 is connected to the collector of the transistor Tr13. The emitter of the transistor Tr14 is connected to the negative lead wire W2 while the collector thereof is connected to one of the input terminals of the distance measuring element DM. The other input terminal of the distance measuring element DM is connected to the positive lead wire W2. A series connection of switch SW and resistors R14 and R15 is connected between the positive and negative lead wires W1 and W2. The switch SW is a normally open switch incorporated in the shutter releasing mechanism (not shown). The switch SW closes for a predetermined period of time immediately after thr released shutter is closed. A transistor Tr15 has its base connected to a junction J6 between the resistors R14 and R15 and its emitter connected to the negative lead wire W2. The collector of the transistor Tr15 is connected through a resistor R16 to the base of the transistor Tr16.

Since the automatic rangefinder FC and lens positioning mechanism employed in this embodiment are similar to those in the previous embodiment, they are not described for the sake of brevity, however, the operation of the power supplying circuit PS of this embodiment is explained hereinbelow.

Starting from the position as shown in FIG. 4 in which the shutter releasing mechanism (not shown) is loaded while the switch SW is opened for maintaining the transistors Tr15 and Tr16 in non-conductive states, and upon application of a finger pressure to the shutter button 30, a pulse signal having a differentiated waveform is generated across the resistor R11 so that the transistor Tr11 can temporarily conduct. Accordingly, a current temporarily flows through the transistor Tr11 and the resistor R12 for turning the transistor Tr12 on. As a consequence, the base of the transistor Tr13 has a biasing voltage applied thereto to allow a continuous flow of current through the resistor R12 and transistor Tr12, even after the transistor Tr11 returns to a non-conductive state. In other words, the differentiated pulse signal serves as a triggering signal for turning on the transistor Tr13 while the transistors Tr12 and Tr13 serve as a memory circuit. The biasing voltage applied to the transistor Tr13 is also applied to the base of the transistor Tr14 for supplying power to the distance measuring element DM. Thereafter, the distance measuring element DM produces a zone signal indicative of the zone in which the target object is located and turns on the indication lamp IL announcing that it is ready to take a photograph. Upon pressing down the shutter button 30, the lens positioning mechanism fixes the objective lens assembly at the appropriate position in a manner similar to that described with reference to FIG. 1 and, thereafter, the shutter is released. Note that the shutter button 30 can be pressed down before the indication lamp IL is turned on, since the time necessary for pressing down the shutter button 30 and disengaging the movable plate 9 (FIG. 1) from the lever 3 is enough for the distance measuring element DM to produce the zone signal. Immediately after the shutter is closed, the switch SW is closed to turn on the transistors Tr15 and Tr16. Thus, the transistor Tr13 is turned off and, also the transistor Tr14 is turned off to interrupt the supply of the power to distance measuring element DM.

Usually, when taking a photograph, the photographer aims at the target object, takes a good hold of the camera and places his finger on the shutter button before pressing down the shutter button. Since the distance measuring element DM operates electronically, there is enough time for distance measuring element to assume a stable condition before the shutter is pressed down, thus the distance measuring element produces a stable output signal. Therefore, the power supplying apparatus of the present invention provides an advantage in that accurate measurement is ensured while saving electric power since power is consumed only during the time interval between the application of the finger pressure to the shutter button and the depression of the shutter button.

Although the present invention has been fully described by way of examples with reference to the accompanying drawings, it is to be noted that various changes and modifications are apparent to those skilled in the art. For example, the detection of a finger touch on the shutter button may be effected by detection of the disturbance of an electromagnetic or electrostatic field around the shutter button by the approach of the finger which accordingly enables the power supplying circuit to operate. The power supplying circuit can be embodied by connections other than those shown in FIGS. 1 and 4, so long as the supply of power caused by the application of the finger touch lasts until the depression of the shutter button. Furthermore, the distance measuring element DM can be of any other type than that described above. Therefore, such changes and modifications, unless they depart from the true scope of the present invention, should be construed as included therein.

What we claim:

1. A power supplying system for use in a camera comprising in combination:
    a source of electric power;
    an automatic distance measuring system for producing, upon receipt of an electric power from said power source, a signal indicative of the distance from the camera to a target object to be photographed;
    an objective lens movable relative to a focal plane of the camera for focusing on said focal plane an image of the target object;
    focusing means operatively connected to said objective lens and said automatic distance measuring system actuable for moving said objective lens in accordance with said signal; and
    a shutter release button including a switch mechanism connected to said source of electric power and said automatic distance measuring system and having first and second terminals disposed adjacent to and insulated from each other on a top surface of saud shutter release button for connecting electric power from said power source to said automatic distance measuring system upon application of a finger to both said first and second terminals, and a shaft member connected to said focusing means for actuating said focusing means when said shutter release button is depressed.

2. A power supplying system as claimed in claim 1, wherein said system further comprises:
    a memory circuit connected to said shutter release button, said source of electric power and said automatic distance measuring system, for continuously connecting electric power from said power source to said automatic distance measuring system from the application of a finger to both said first and second terminals until said shutter release button is depressed.

3. A power supplying system for use in a camera comprising in combination:
a source of electric power;
an automatic distance measuring system for producing, upon receipt of an electric power from said power source, a signal indicative of the distance from the camera to a target object to be photographed;
an objective lens movable relative to a focal plane of the camera for focusing on said focal plane an image of the target object;
focusing means operatively connected to said objective lens and said automatic distance measuring system actuable for moving said objective lens in accordance with said signal; and
a shutter release button including a switch mechanism connected to said source of electric power and said automatic distance measuring means and having a pressure sensing element disposed on a top surface of said shutter release button for connecting electric power from said power source to said automatic distance measuring means upon detection of the pressure of a finger upon said top surface of said shutter release button, and a shaft member connected to said focusing means for actuating said focusing means when said shutter release button is depressed.

4. A power supplying system as claimed in claim 3, wherein said pressure sensing element comprises a layer of piezoelectric material.

5. A power supplying system as claimed in claim 3, wherein said system further comprises:
a memory circuit connected to said shutter release button, said source of electric power and said automatic distance measuring system, for continuously connecting electric power from said power source to said automatic distance measuring system from the detection of the pressure of a finger upon said top surface of said shutter release button until said shutter release button is depressed.

6. A power supplying system for use in a camera comprising in combination:
a source of electric power;
an automatic distance measuring system for producing, upon receipt of an electric power from said power source, a signal indicative of the distance from the camera to a target object to be photographed;
an objective lens movable relative to a focal plane of the camera for focusing on said focal plane an image of the target object;
focusing means operatively connected to said objective lens and said automatic distance measuring system actuable for moving said objective lens in accordance with said signal; and
a shutter release button including a switch mechanism connected to said source of electric power and said automatic distance measuring means and having a pressure sensing element disposed on a top surface of said shutter release button for generating a pressure signal upon detection of the pressure of a finger upon said top surface of said shutter release button, an electric switch means connected to said source of electric power, said automatic distance measuring means and said pressure sensing element for connecting electric power from said power source to said automatic distance measuring means upon generation of said pressure signal by said pressure sensing element, and a shaft member connected to said focusing means for actuating said focusing means when said shutter release button is depressed.

7. A power supplying apparatus as claimed in claim 6 wherein said system further comprises:
a memory circuit connected to said shutter release button, said source of electric power, and said automatic distance measuring system, for continuously connecting power from said power source to said automatic measuring system from the generation of said pressure signal until said shutter release button is depressed.

8. A power supplying system as claimed in claim 6 wherein said pressure sensing element comprises a layer of piezoelectric material.

* * * * *